(12) United States Patent
Winkler et al.

(10) Patent No.: US 9,551,296 B2
(45) Date of Patent: Jan. 24, 2017

(54) METHOD AND APPARATUS FOR NOZZLE THRUST VECTORING

(71) Applicant: The Boeing Company, Chicago, IL (US)

(72) Inventors: Chad M. Winkler, Glen Carbon, IL (US); Andrew J. Dorgan, Edwardsville, IL (US); Eric L. Werner, Des Peres, MO (US)

(73) Assignee: The Boeing Company, Chicago, IL (US)

( * ) Notice: Subject to any disclaimer, the term of this patent is extended or adjusted under 35 U.S.C. 154(b) by 371 days.

(21) Appl. No.: 14/158,954

(22) Filed: Jan. 20, 2014

(65) Prior Publication Data

US 2014/0145001 A1 May 29, 2014

Related U.S. Application Data

(63) Continuation-in-part of application No. 12/726,605, filed on Mar. 18, 2010, now abandoned.

(51) Int. Cl.
*F02K 1/28* (2006.01)
*F02K 1/00* (2006.01)

(52) U.S. Cl.
CPC *F02K 1/28* (2013.01); *F02K 1/002* (2013.01)

(58) Field of Classification Search
CPC .............. F02K 9/82; F02K 1/28; F02K 1/002; F02K 1/008; F02K 1/38; B64C 2230/16
See application file for complete search history.

(56) References Cited

U.S. PATENT DOCUMENTS

| 2,846,843 A | | 8/1958 | Clark et al. |
|---|---|---|---|
| 3,010,280 A | | 11/1961 | Hausmann |
| 3,109,284 A | | 11/1963 | Ashwood |
| 3,230,702 A | | 1/1966 | Soulez-Lariviere et al. |
| 3,374,954 A | * | 3/1968 | Card ........................ F02K 9/82 239/127.1 |
| 3,759,039 A | * | 9/1973 | Williams ................. F02K 9/82 239/265.23 |
| 4,947,644 A | | 8/1990 | Hermant |
| 5,016,818 A | | 5/1991 | Nash et al. |
| 5,101,624 A | | 4/1992 | Nash et al. |
| 5,328,098 A | | 7/1994 | Barcza et al. |
| 5,435,127 A | | 7/1995 | Luffy et al. |

(Continued)

OTHER PUBLICATIONS

Deere, K. "Summary of Fluidic Thrust Vectoring Research Conducted at NASA Langley Research Center", AIAA Paper 2003-3800, Document ID: 20030062131, 2003.

(Continued)

*Primary Examiner* — Andrew Nguyen
(74) *Attorney, Agent, or Firm* — Felix L. Fischer

(57) ABSTRACT

A thrust vectoring system is created with a convergent-divergent nozzle having a total angle no greater than 150 degrees. A divergent portion of the nozzle has a wall at a predetermined angle of at least 12° from the freestream direction. A disturbance generator is located on the wall to induce flow separation from the wall with the predetermined wall angle sufficient for the induced flow separation to extend upstream from disturbance generator substantially to a throat of the nozzle pressurizing the wall and creating a net vector angle in jet flow through the nozzle.

21 Claims, 20 Drawing Sheets

(56) References Cited

U.S. PATENT DOCUMENTS

| | | | |
|---|---|---|---|
| 5,996,936 A | 12/1999 | Mueller | |
| 6,112,512 A * | 9/2000 | Miller | F02K 1/28 239/265.17 |
| 6,308,898 B1 * | 10/2001 | Dorris, III | F02K 1/34 239/265.17 |
| 6,336,319 B1 | 1/2002 | Koshoffer | |
| 6,382,559 B1 | 5/2002 | Sutterfield et al. | |
| 6,398,129 B1 | 6/2002 | Johnson | |
| 6,679,048 B1 * | 1/2004 | Lee | F02K 1/002 239/265.23 |
| 6,962,044 B1 | 11/2005 | Miller et al. | |
| 6,996,973 B2 | 2/2006 | Dujarric | |
| 7,479,302 B2 | 1/2009 | Steffier | |
| 7,815,146 B2 | 10/2010 | Hawkins et al. | |
| 2005/0011989 A1 * | 1/2005 | Chasman | F42B 10/663 244/3.21 |
| 2006/0186264 A1 * | 8/2006 | Avenell | B64C 15/02 244/23 A |
| 2007/0119827 A1 * | 5/2007 | Miller | B64C 23/005 219/121.51 |
| 2010/0089031 A1 * | 4/2010 | Wells | F02K 1/08 60/228 |

OTHER PUBLICATIONS

"Collins English Dictionary, HarperCollins Publishers 2000, definition of slot".

* cited by examiner

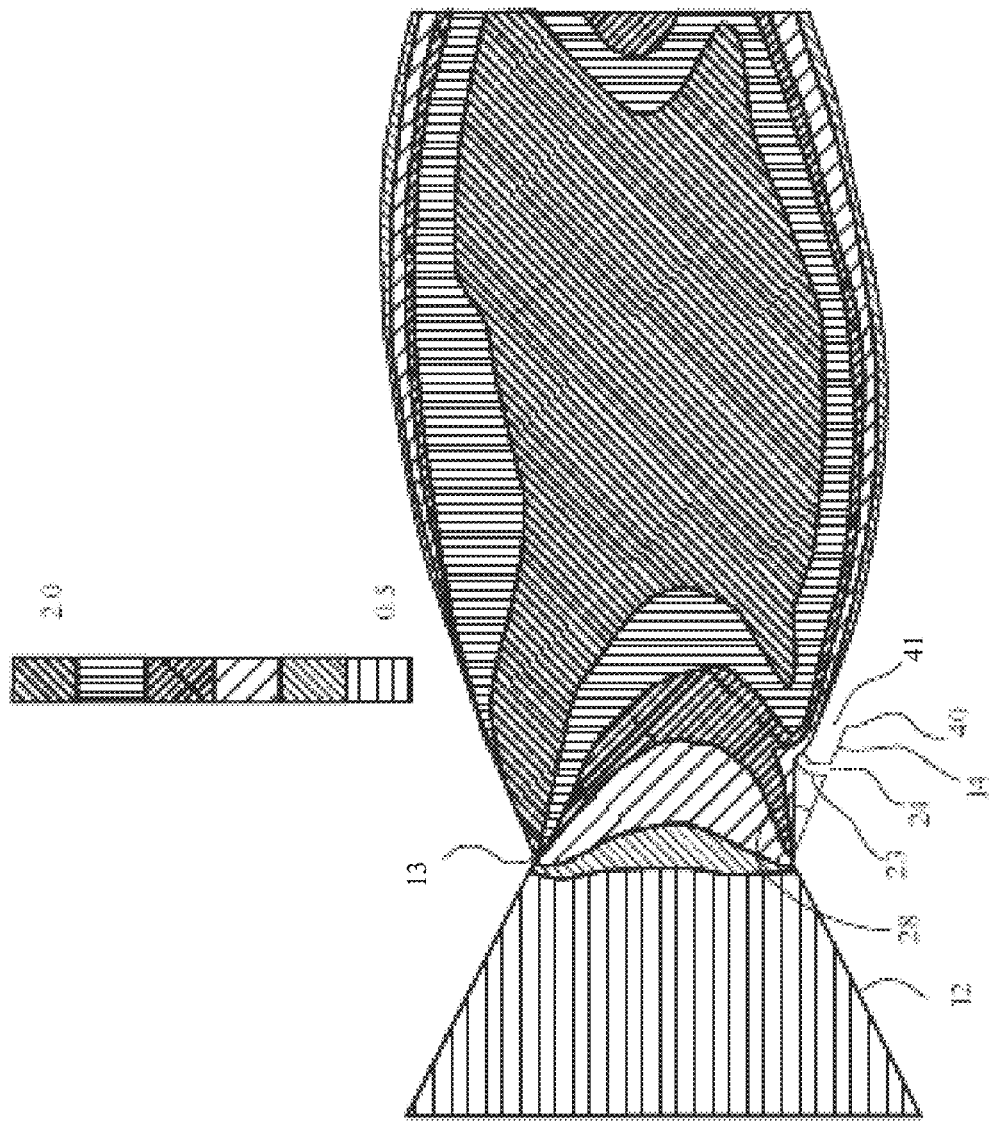

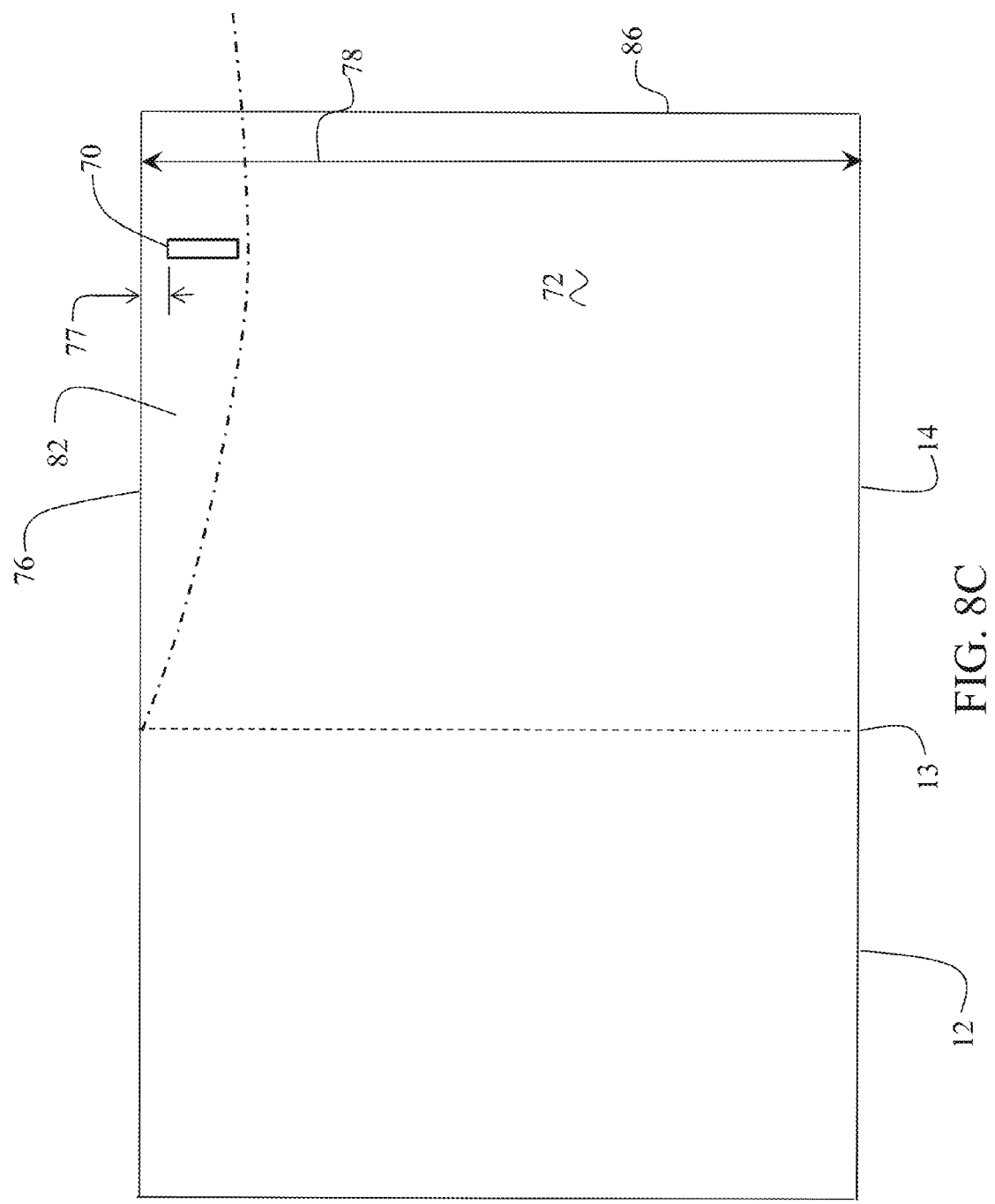

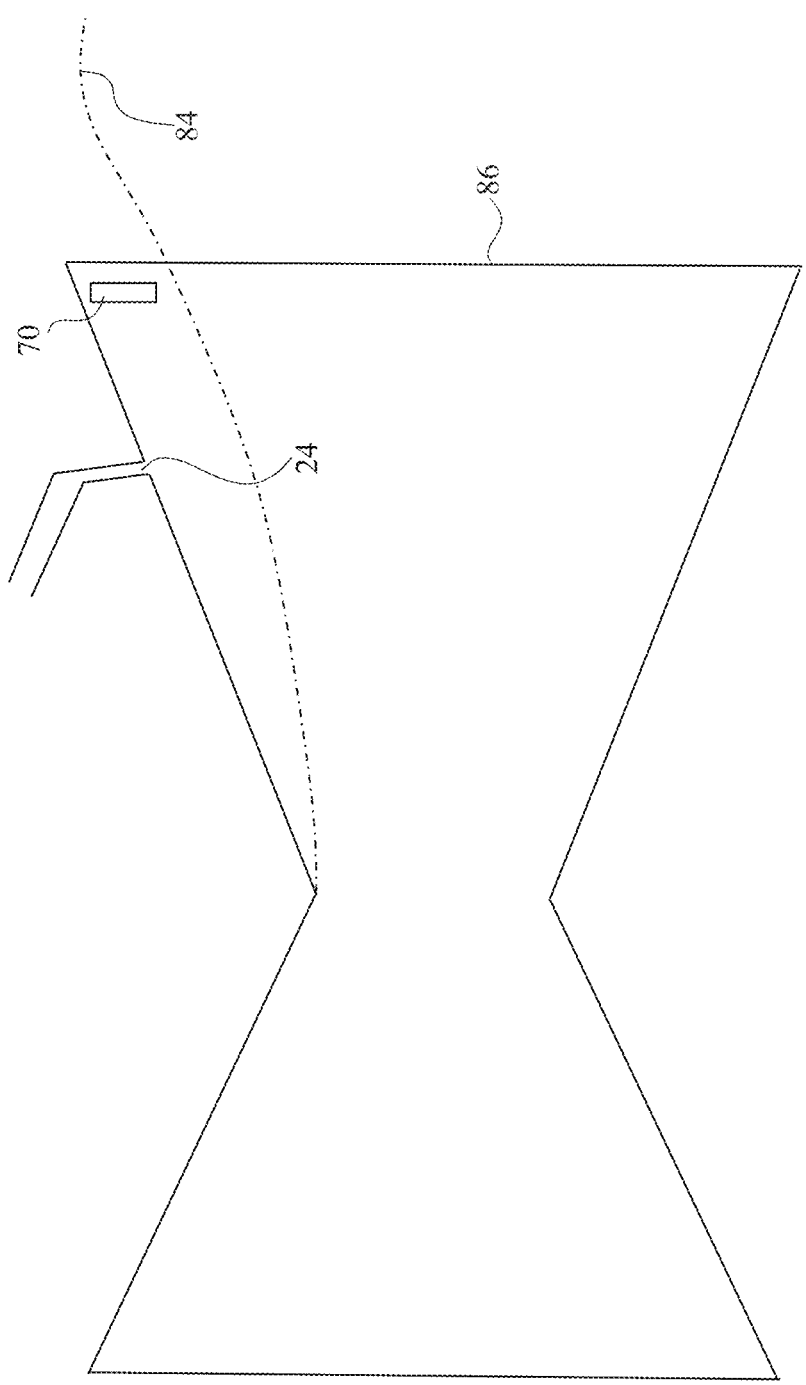

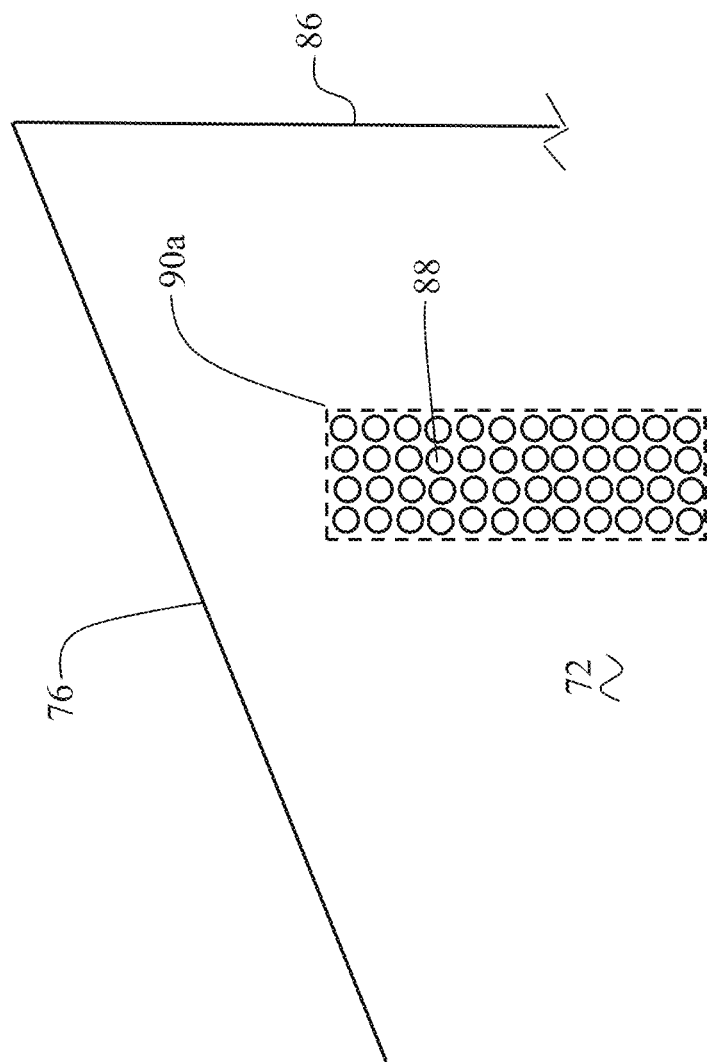

METHOD AND APPARATUS FOR NOZZLE THRUST VECTORING

REFERENCE TO RELATED APPLICATIONS

This application is a continuation-in-part of application Ser. No. 12/726,605 filed on Mar. 18, 2010 entitled METHOD AND APPARATUS FOR NOZZLE THRUST VECTORING having a common assignee with the present invention, the disclosure of which is incorporated herein by reference.

BACKGROUND INFORMATION

Field

Embodiments of the disclosure relate generally to the field of vectoring of jet engine nozzle exhaust and more particularly to embodiments for inducing shockless flow separation in the divergent section of an exhaust nozzle to asymmetrically alter the effective divergence angle of the nozzle walls, thus creating thrust vectoring.

Background

Vectoring of jet engine nozzle exhaust for added aerodynamic control of aircraft has been employed in various designs. With additional requirements for increased maneuverability and performance of modern jet aircraft, vectored thrust systems have become highly important in achieving overall performance goals. The thrust vectoring methods in past systems can generally be categorized in two groups: mechanical and fluidic. Mechanical systems often use deflecting surfaces or gimballing of the entire nozzle to physically direct the flow in a desired direction. Fluidic systems generally fall into two subcategories: shock vectoring and sonic line skewing. Shock vectoring schemes inject flow into the divergent section of the nozzle such that a shock wave is generated in the supersonic flow thereby turning the flow. Sonic line skewing can be achieved by injecting flow near the throat of the nozzle and thus "skewing" the throat to direct flow at an angle through the divergent section.

Mechanical systems are heavy due to the requirements for large control surfaces and actuators. Shock vectoring typically requires large amounts of injection to generate a sufficiently strong shock to alter the flow direction. Large amounts of injected flow are not preferable due to the performance impact on the engine to supply the large amounts of secondary flow for injection (flow that could otherwise be used to produce thrust). Additionally, the strong shock wave created in the divergent section reduces thrust. Sonic line skewing requires intricate nozzle inner mold line shaping to assure the skewed throat is the same area as the undisturbed throat thus maintaining a constant mass flow through the duct across its operating envelope. Sonic line skewing also requires large amounts of injected flow.

It is therefore desirable to avoid the weight penalties of mechanical thrust vectoring systems by providing a fluidic thrust vectoring using less flow injection than current fluidic systems to achieve desired vector angles. It is also desirable to provide thrust vectoring which does not impact the nozzle throat area, thus easily maintaining the engine mass flow. Additionally, it is desirable to provide thrust vectoring which is simple to implement and provides an effective fluidic vectoring solution while minimizing thrust loses.

SUMMARY

According to some embodiments, provided is a thrust vectoring system with a convergent-divergent nozzle, including a convergent inlet portion, a divergent outlet portion and a sharp throat therebetween. In some examples, a total angle between the convergent inlet portion and divergent outlet portion may be no greater than 150 degrees. A divergent portion of the nozzle has a substantially flat divergent wall at a predetermined angle of at least 12° from the streamwise nozzle axis direction. A disturbance generator is located to induce shockless flow separation on the divergent wall. The predetermined wall angle is sufficient for the induced flow separation to extend upstream from disturbance generator substantially to the throat of the nozzle. This pressurizes the divergent wall and creates a net vector angle in the exhaust flow. In certain exemplary embodiments a convergent portion of the nozzle has a wall at a predetermined angle of at least 18°.

For one embodiment the disturbance generator is an injection flow slot which may be located at least 50% of a divergence length from the throat of the nozzle to a trailing edge of the nozzle for certain engine and aerodynamic conditions or between 25% and 75% of a divergence length for alternative conditions.

In certain exemplary embodiments the convergent-divergent nozzle is a two-dimensional (2D) nozzle having a first injection flow slot on a lower wall of the nozzle and a second injection flow slot on an upper wall of the nozzle.

In alternative embodiments, the convergent-divergent nozzle is a two-dimensional (2D) nozzle having an injection flow slot on a wall orthogonally adjacent the divergent wall or a trapezoidal nozzle having an injection flow slot on a wall adjacent the divergent wall on which separation is desired.

In yet other embodiments the convergent-divergent nozzle is a three-dimensional (3D) nozzle having multiple injection flow slots arranged circumferentially around the divergent portion of the nozzle.

In operation the embodiments create a method for thrust vectoring by providing a convergent-divergent nozzle with a sharp throat, a total angle of less than 150° and a divergence angle of at least 12° with a disturbance generator located at a predetermined location on a divergent portion of the nozzle. Magnitude of the disturbance created by the disturbance generator is controlled to create non-shock induced flow separation from a wall of the divergent portion. The predetermined location of the disturbance generator is defined to create a flow separation zone extending substantially from the nozzle throat to the nozzle trailing edge and the magnitude of the disturbance is controlled to create the flow separation zone with sufficient magnitude to induce a desired flow vector angle.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

FIGS. 3A-3D are side cross-section views of representations of the flow fields from a Computational Fluid Dynamics (CFD) solution for a 2D nozzle according to the present disclosure;

FIG. 8C is a top view of a 2D nozzle embodiment of FIG. 8A;

FIG. 9B is a top view of the embodiment of FIG. 8C;

FIG. 10B is a plan view of a perforated injector having a rectangular planform;

DETAILED DESCRIPTION

Figure 1A:
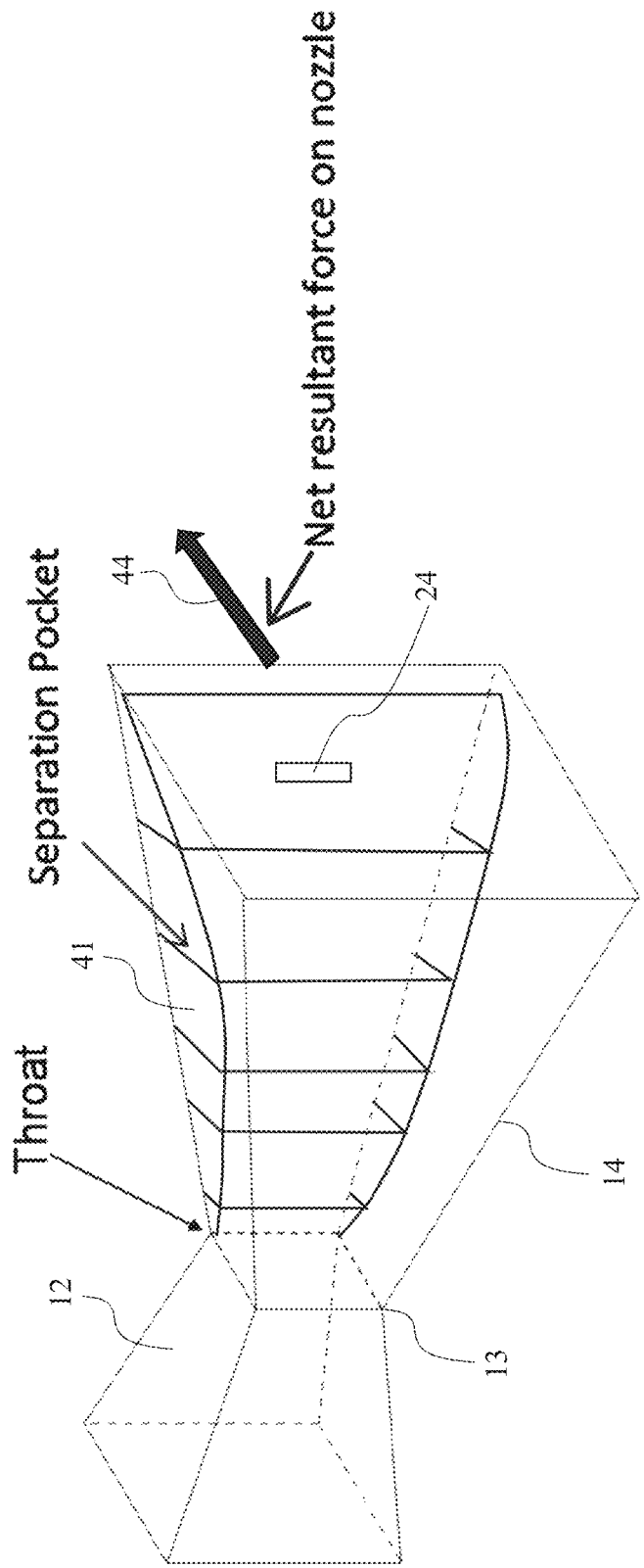
FIG. 1A is pictorial representation of an embodiment of a 2D Nozzle according to the present disclosure.

The present disclosure describes embodiments of a nozzle having a convergent inlet portion and a divergent outlet portion (e.g., a convergent-divergent nozzle). Methods for thrust vectoring employing a convergent-divergent nozzle are described. The convergent portion has a convergent cross section and the divergent portion has a divergent cross section. The divergent portion includes walls at an angle which is steeper than angles normally used in conventional nozzle designs. This steeper wall angle may facilitate an efficient flow separation, as will be further described herein. The divergent portion includes walls, which extend from a sharp nozzle throat and are substantially flat. The nozzle may further include a disturbance generator, which may be located in the divergent portion. The disturbance generator is configured to generate a disturbance, which causes flow separation without the formation of a shock wave (e.g., "shockless" flow separation). Inducing flow separation in the divergent section of the nozzle creates a separation pocket, which fluidically changes the divergence angle of one or more walls in a 2 dimensional (2D) nozzle or comparable structure in a three dimensional (3D) nozzle (e.g., a trapezoidal nozzle or a cylindrical nozzle). The wall previously contacting the separated flow may be referred to as separation wall. The change of the divergence angle results in asymmetry of the flow, which asymmetry results in thrust vectoring as the effective shape of the divergent jet in the nozzle is rotated off centerline. The disturbance generator may be of any suitable design, for example and without being limiting a fluidic jet, pulsed jet, or synthetic jet such as a vibrating membrane or sonic impulse with no net mass flux. Other devices or methods may be used to produce a disturbance sufficient to cause separation of the jet flow from the wall according to the examples herein. The wall angle is selected to cause the separation to travel upstream from the location of the disturbance generator (e.g., jet) to a location just aft of but substantially at the throat.

As described herein, a disturbance generator may be located along one of a plurality of walls of the divergent portion. The disturbance generator may generate a disturbance which may cause flow separation along the wall of the divergent portion on which the disturbance generator is located (e.g., the separation wall). In some examples, a plurality of disturbance generators may be used along one or more walls of the divergent portion. In further examples, disturbance generators along one wall may cause separation along adjacent walls. For example, a disturbance may be generated by a source (e.g., disturbance generator) on a wall adjacent to (e.g., orthogonal to) the separation wall. According to the examples herein, one or more disturbance generators may be positioned in the divergent portion to cause shockless flow separation. Locating the source of disturbance (e.g., disturbance generator) along an adjacent wall may pressurize the entire wall to the throat, providing a net vector angle. By separating the flow the entire length of the divergent wall from the trailing edge or exit to the throat (e.g., divergence length), no shock is generated in the divergent section ("shockless" separation of the flow from the divergent wall) and the sonic line remains undisturbed.

Figure 1B:
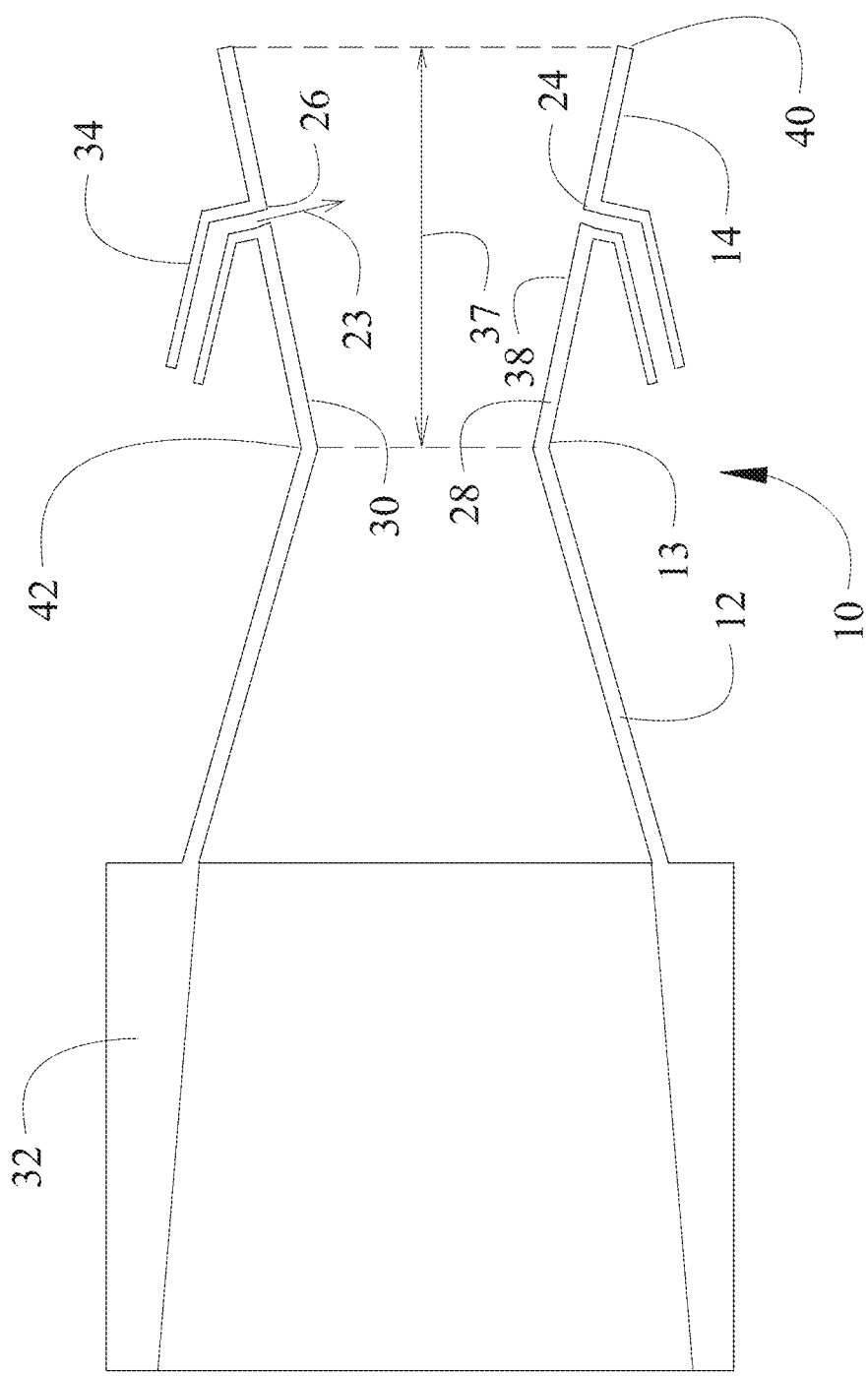
FIG. 1B is a side cross-section view of another embodiment according to the present disclosure.
Figure 2:
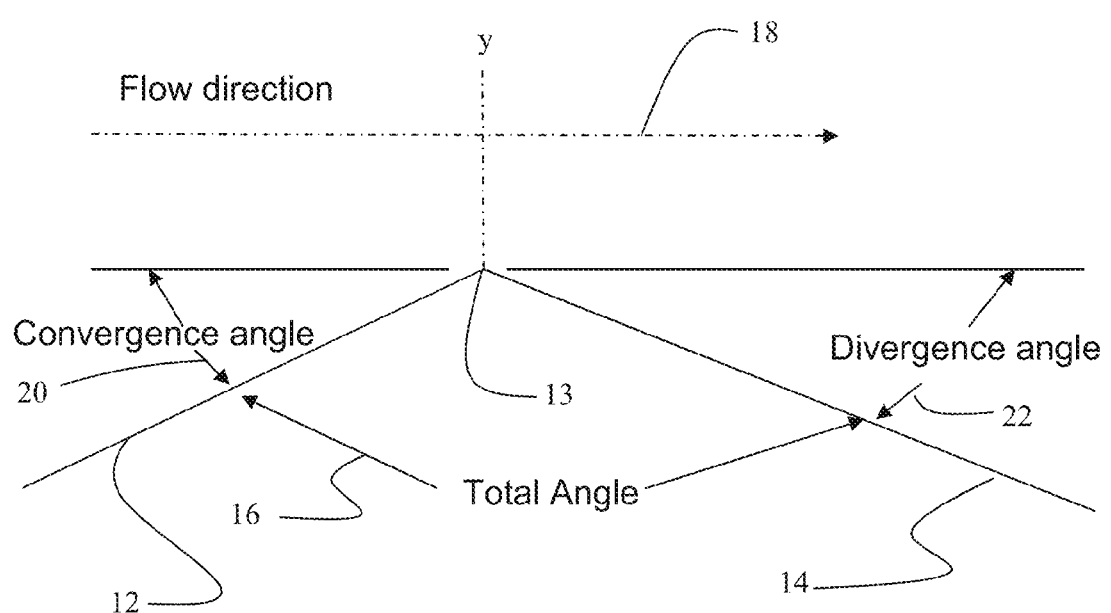
FIG. 2 is an illustration of a cross-section of walls of a nozzle according to the present disclosure, depicting angular relationships of convergent and divergent portions of the nozzle.

Referring to the drawings, FIGS. 1A and 1B show an exemplary embodiment having a nozzle 10 with a convergent inlet portion 12 and a divergent outlet portion 14. As represented in FIG. 2, the total angle 16 between the convergent inlet portion and divergent outlet portion is less than or equal to 150°. With respect to a streamwise nozzle axis 18, the convergence angle 20 of the inlet portion is greater than 18° and the divergence angle 22 of the outlet portion is greater than 12°. The exact angles are chosen by taking into account the maximum vector angle desired as well as the desired expansion ratio and mass flow rates of the nozzle. Greater divergent angles will generally lead to greater vector angles and more vectoring effectiveness. In most embodiments, the convergent angle will be steeper (having a greater angle magnitude) than the divergent angle. Divergent angles less than 12 degrees will typically result in shock vectoring and are not appropriate for the current disclosure. The exact angle of shock vectoring onset is dependant upon many factors such as expansion ratio and pressure, and the values employed in the embodiments disclosed herein are typical. The convergent inlet portion 12 and divergent outlet portion 14 intersect at a sharp nozzle throat 13. The "sharpness" of the nozzle throat 13 may be quantified in terms of the second derivative (termed y'') of a curve defining the surface geometry of the intersecting convergent inlet portion 12 and divergent outlet portion 14 at the nozzle with respect to the streamwise direction. For some embodiments, an absolute magnitude of the second derivative, $|y''|$, may be greater than from about 4 inch$^{-1}$ to about 8 inch$^{-1}$. For example, in some embodiments, if the throat is at x=0 inches, then a typical throat curve may have the form $y=(0.125^2-x^2)^{0.5}$ inches. The second derivative at the throat would then be $y''=-1/0.125$ inch$^{-1}$, or $|y''|=8$ inch$^{-1}$. Additionally, the divergent outlet portion 14 may have substantially flat walls with respect to the flow direction. For example, the absolute value of the second derivative, $|y''|$, may be about 0.005 inch$^{-1}$ to about 0.002 inch$^{-1}$. In some examples, for the divergent section to encompass a "substantially flat" divergent wall, the curve may be defined by the equation $y=(200-x^2)^{0.5}$ inches. For such examples, the second derivative, with x=0 centered in the divergent section midpoint, would be y"=−0.005 inch$^{-1}$, or |y"|=0.005 inch$^{-1}$.

In the example in FIG. 1B, a plurality of disturbance generators (e.g., disturbance generators 24, 26) are shown, each configured to generate a flow disturbance in the divergent outlet portion 14 using fluidic jets. Fluidic jets may be operable to introduce a flow of a fluid (e.g., as represented by arrows 23) through one or more slots formed on one or more divergent walls of the nozzle (e.g., a lower divergent wall 28 and an upper divergent wall 30, respectively). While multiple disturbance generators are shown in this example, in some examples only one disturbance generator along one wall of the nozzle may be used. In addition, the designation of an upper and/or lower wall is used for purposes of illustration and is not limiting; the disturbance generator(s) may be located along any divergent wall (including top, bottom, or side walls) of the nozzle as may be suitable for the particular application.

Figure 3A:
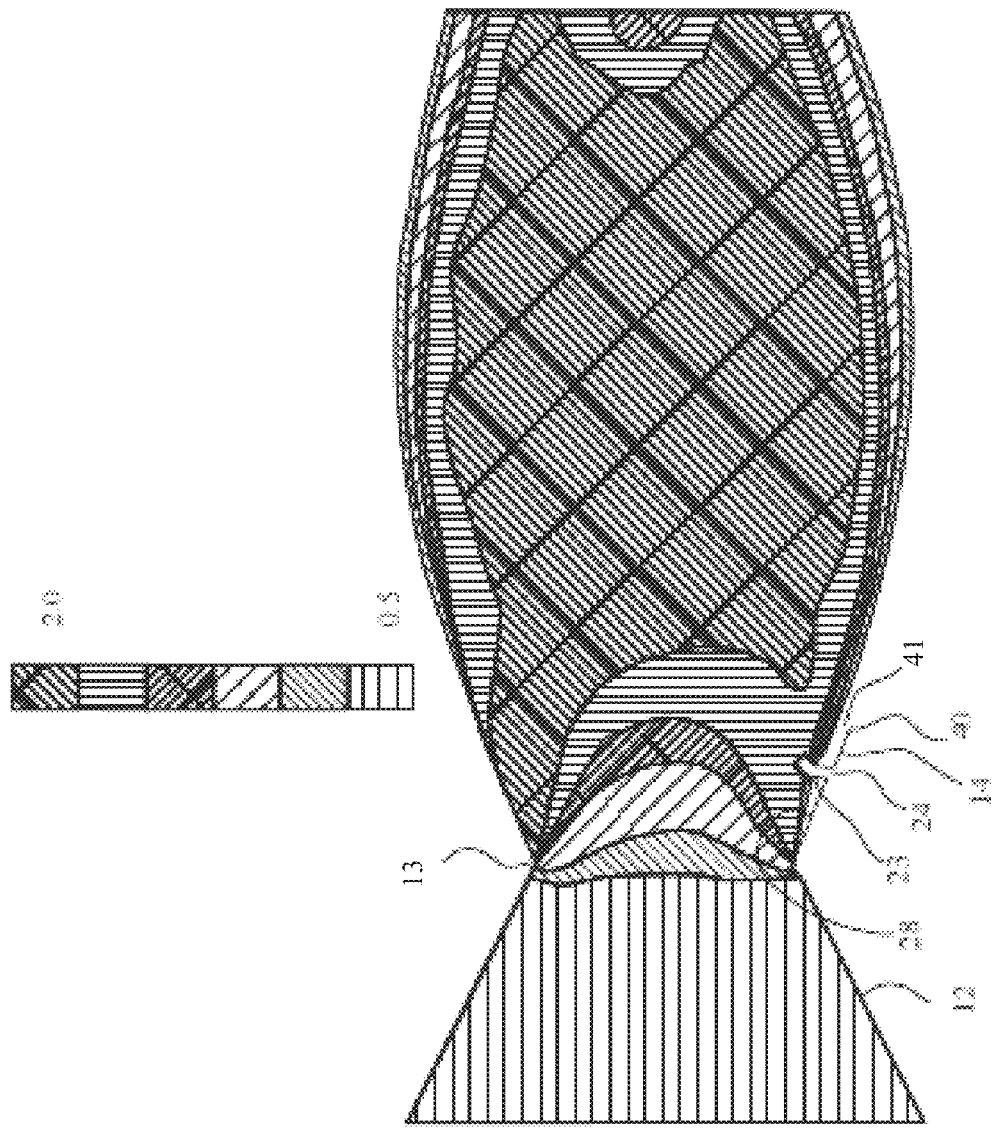
Figure 3B:
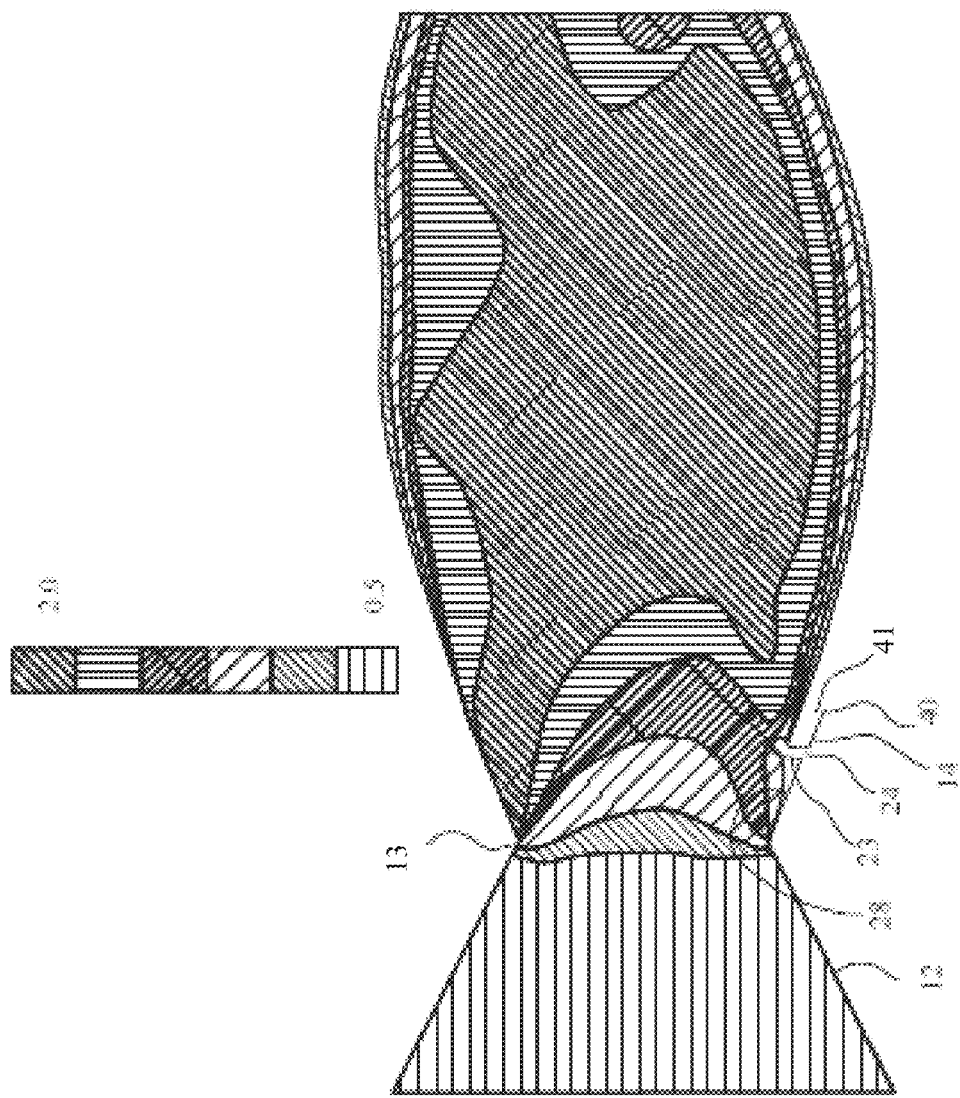
Figure 6:
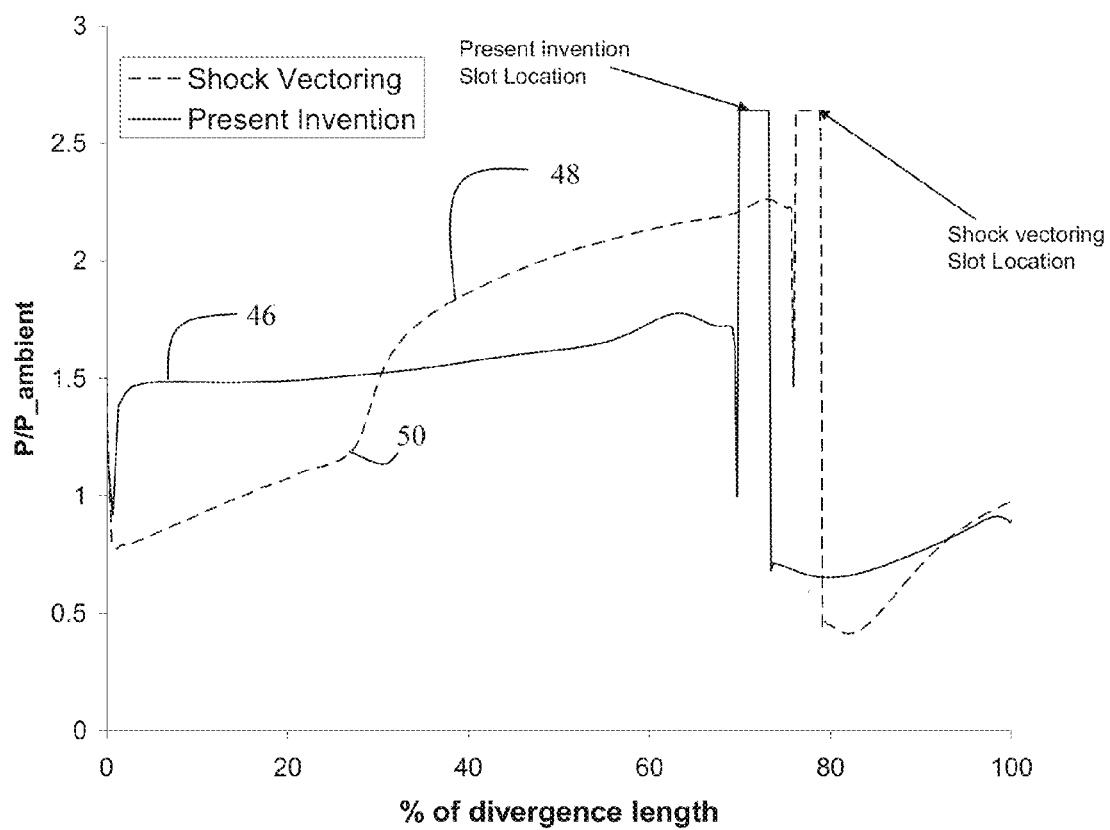
FIG. 6 is a graph of normalized pressure ratio over the length of the divergent portion of an example of a 2D nozzle according to the present disclosure as compared to a shock vector nozzle.
Figure 7:
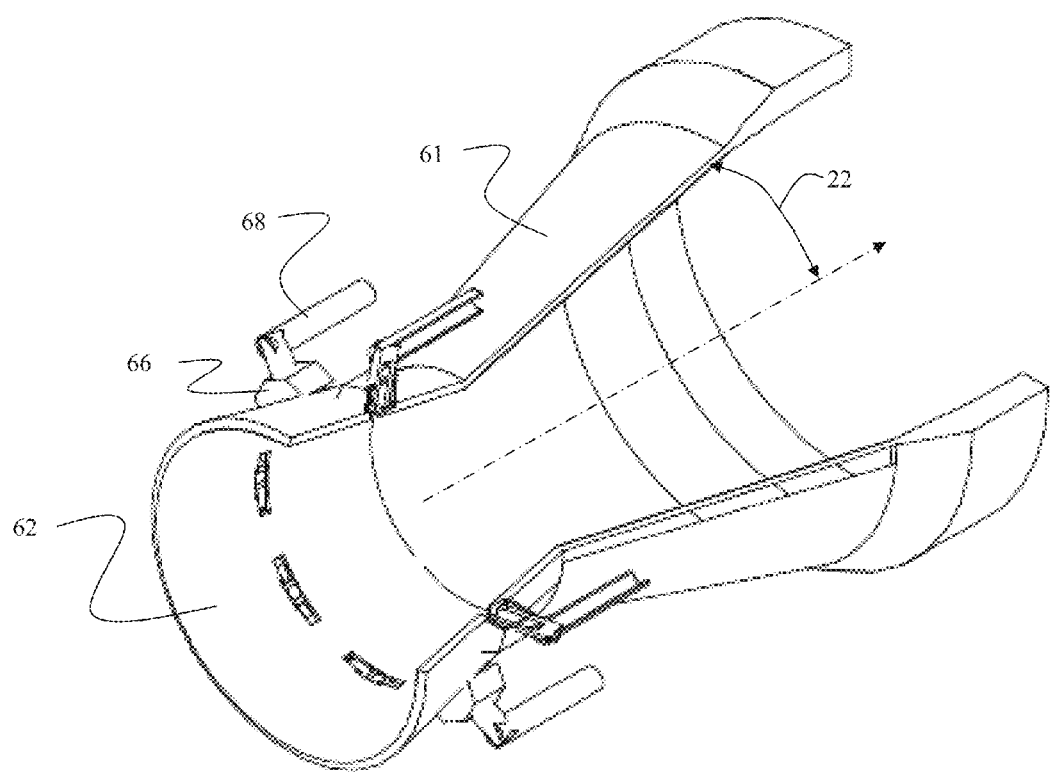
FIG. 7 is an isometric view showing a partial cross-section of a 3D nozzle embodiment according to the present disclosure.

As previously described disturbance generators according to the present disclosure (e.g., disturbance generators 24 and 26 in FIG. 1B) may be implemented using any technology suitable to cause a disturbance in the flow along a divergent wall. In some embodiments, the disturbance generator may include one or more fluidic jets, pulsed jets, synthetic jets (e.g., a vibrating membrane, sonic impulse generator, or the like), or combinations thereof. In some examples, the disturbance generator may be a zero-net mass flux jet (e.g., a synthetic jet). In such examples no secondary fluid may be needed and the existing fluid (e.g., the exhaust gas) may be manipulated to cause the disturbance and thereby induce flow separation. In some embodiments herein (e.g., as shown in FIGS. 1, 3, and 7), the disturbance generators may include "slots" through which fluidic jets, pulsed jets, or synthetic jets may be introduced. In the embodiment in FIG. 1B, a slot 27 of disturbance generator 26 is positioned substantially opposite slot 25 of disturbance generator 24 with respect to the streamwise nozzle axis 18, which may facilitate symmetrical control capability. In other examples, single direction vectoring may be achieved with a slot on only one wall of the divergent outlet portion 14 (e.g., divergent wall 28 or 30). In some examples, injection flow may be provided by engine bleed or other diverted flow from an engine 32 through ducts 34 and 36. Dimensions of the slots and ducts are not to scale in the drawings and have been exaggerated for clarity. For an exemplary trapezoidal or 2D nozzle, slots having spanwise length of 3 inches to 12 inches and a streamwise width of 0.1 inch to 2 inches may be used for nozzle exit dimensions between 70 inches×10 inches to 280 inches×40 inches. The injection location (e.g., location of disturbance generator which may be expressed as a % of divergence length, for example as shown in FIG. 6) is determined based upon the particular nozzle configuration and divergence length 37. In some embodiments, the injection location will be between the midpoint 38 and trailing edge 40 of the divergent outlet portion 14. injection locations further upstream may be utilized in some applications. A nominal range of 25% to 75% of divergence length may be used according to the examples of the present disclosure.

As shown in FIG. 1A, the disturbance generator may cause a flow separation zone or a separation pocket 41 to form. The separation pocket fluidically changes the divergence angle of the exiting flow creating a lateral force on the nozzle as represented by arrow 44. In the context of the present disclosure, fluidically is meant to imply that vectoring of the exiting flow is achieved without the use of mechanical components (e.g., trailing edge flaps or other gimbaling surfaces), without limiting the type of disturbance generator that may be used (e.g., the disturbance generator may or may not introduce a secondary flow to the exiting flow. To facilitate further understanding of the disclosed embodiment, flow fields from a Computational Fluid Dynamics (CM) solution for a 2D nozzle embodiment have been depicted in FIGS. 3A-3D. The embodiment in FIGS. 3A-3D has a nozzle pressure ratio (NPR) of 5 and analysis with varying injection flow was conducted, as described in greater detail subsequently. The Mach profile of the flow is shown in graded contours represented by the hatching in the flow field in increments of 0.25 Mach from Mach 0.5 to Mach 2.0. The generation of a disturbance (in this example, a fluidic injection) takes place on the lower divergent wall 28 through a slot of disturbance generator 24. The flow separates aft of the throat 13 and the flow separation zone (e.g., separation pocket 41) persists to the exit aperture at the trailing edge 40 of the nozzle. No shock is formed since the separation begins just aft of but substantially at the throat where the Mach number is unity. Increasing injection flow results in an increasing vectoring angle of the flow progressing from FIG. 3A with a lower injection flow to FIG. 3D with highest injection flow.

Figure 3D:
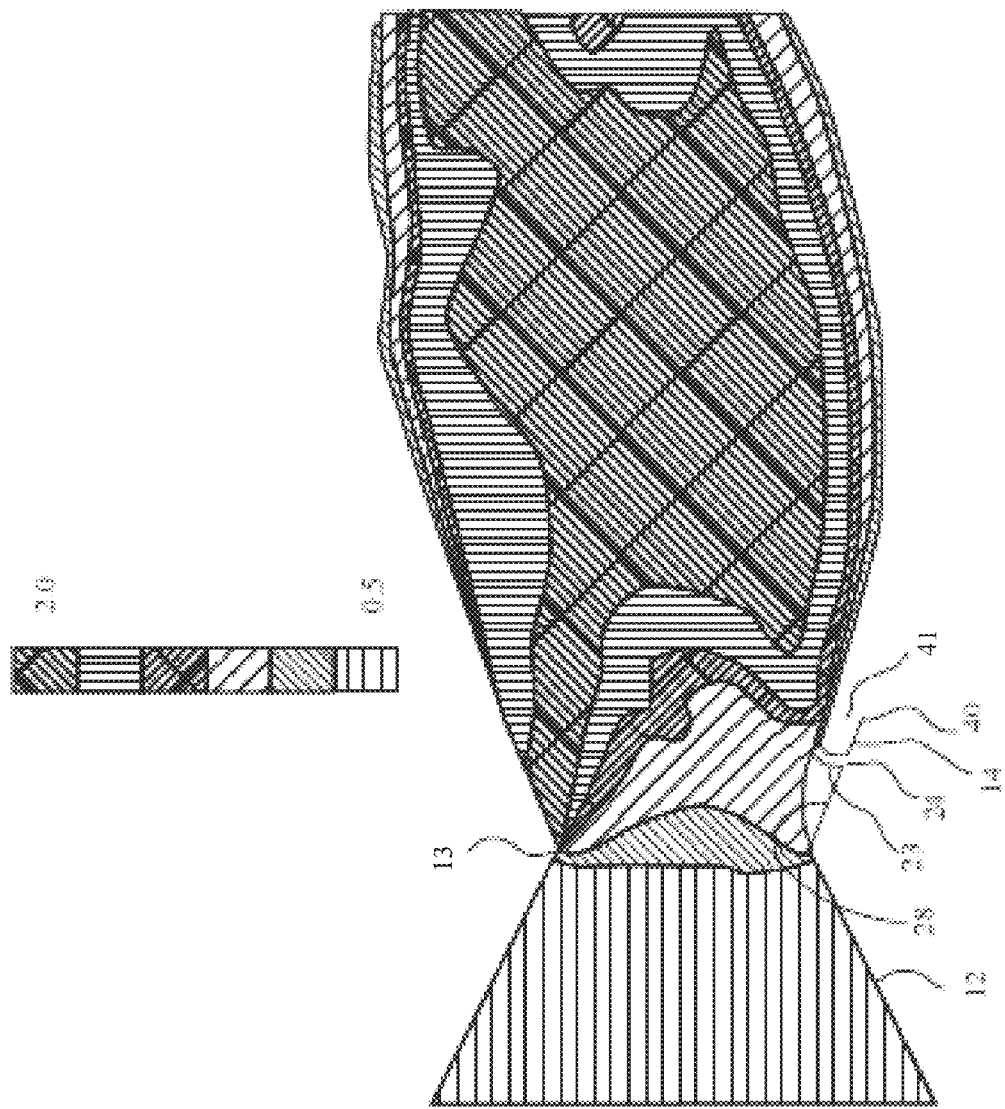
Figure 4:
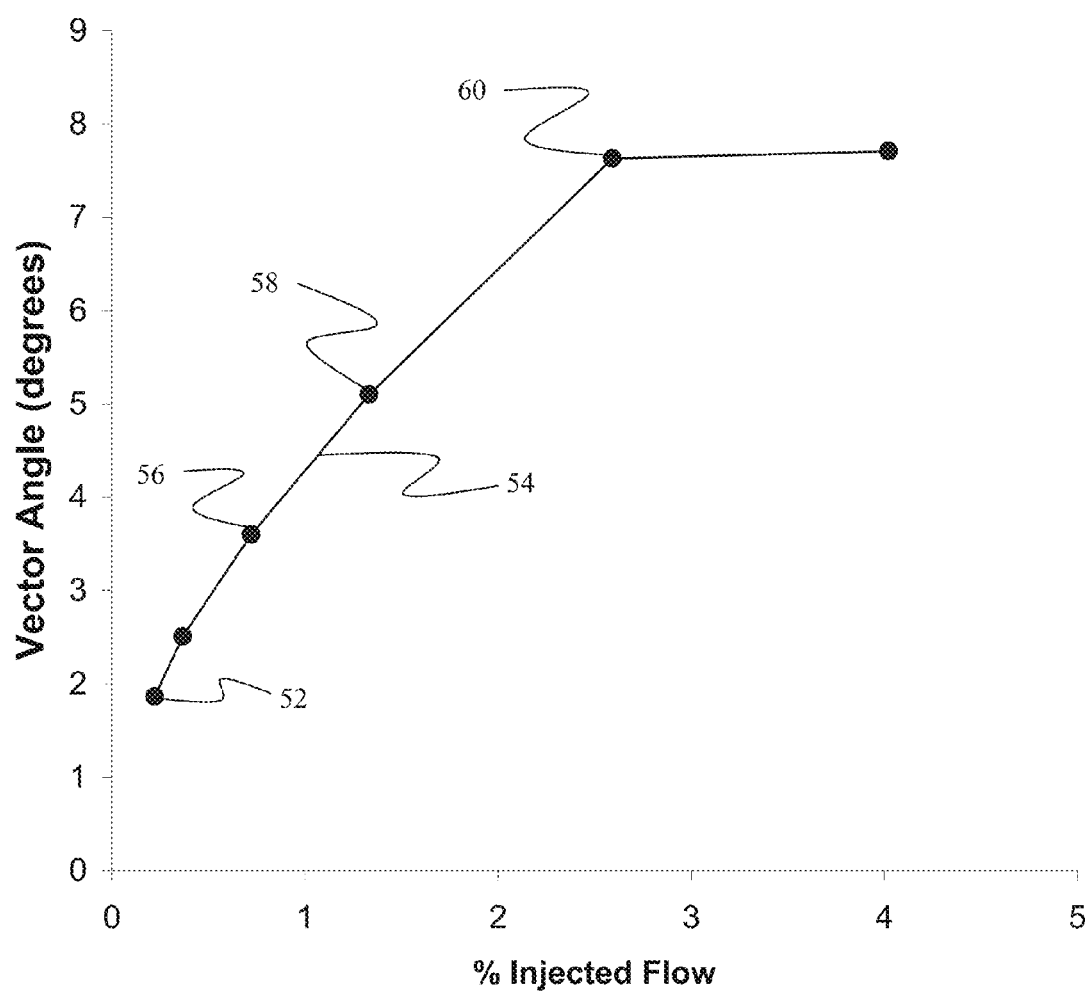
FIG. 4 is a graph of vector angle created as a function of injected flow in the 2D nozzle represented in FIGS. 3A-3D.

FIG. 4 shows a graph of resulting vector angle as a function of injected flow in the 2D nozzle example shown in FIGS. 3A-3D and described above. Referring to FIG. 4 in conjunction with FIGS. 3A-3D, with injected flow shown as a percent of total flow through the nozzle (% injected flow), a 0.2% injected flow through the slot of disturbance generator 24 results in a vector angle change in the jet flow through the nozzle of 1.86° as represented by point 52 on trace 54 in FIG. 3A. Injected flow of 0.8% results in a vector angle change in the flow of 3.6° as represented by point 56 in FIG. 3B. An injected flow of 1.6% results in a vector angle of 5.10° as represented by point 58 in FIG. 3C. An injected flow of 2.5% results in a vector angle of 7.63° as represented by point 60 as shown in FIG. 3D.

Figure 5:
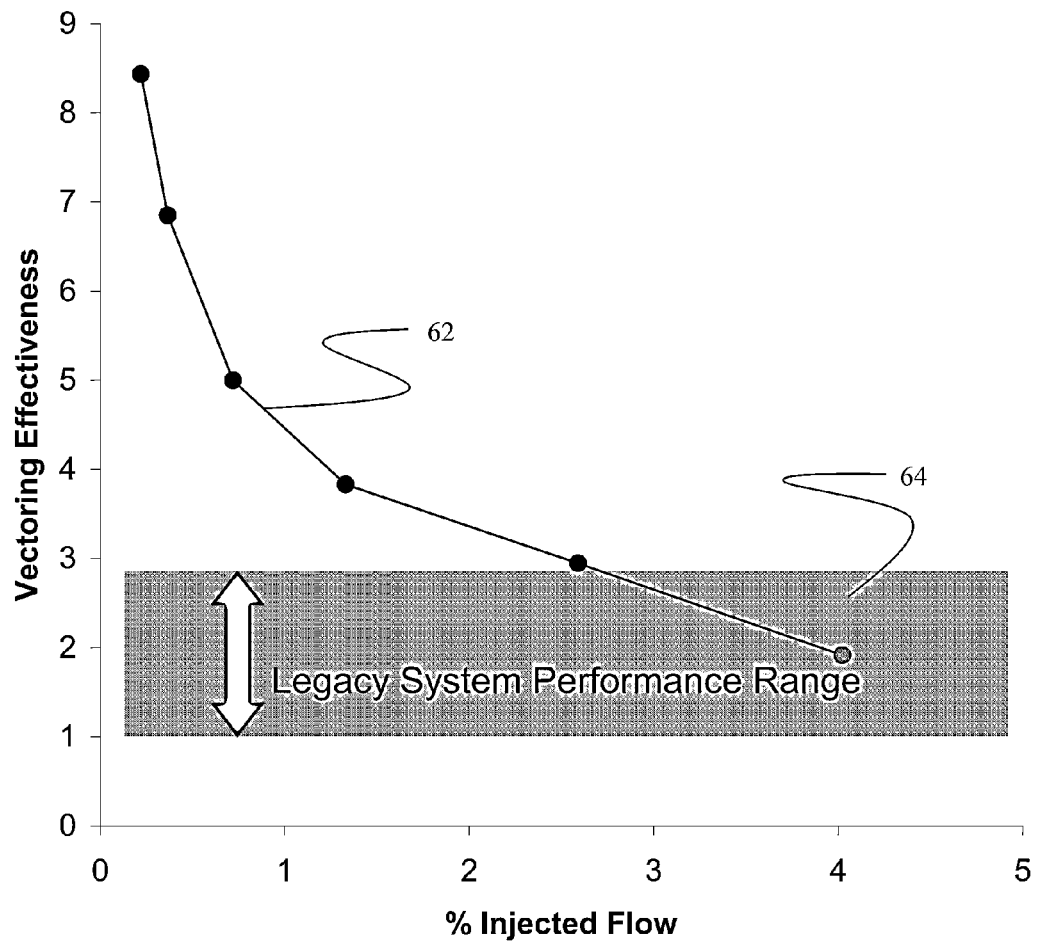
FIG. 5 is a graph of vectoring effectiveness based on injected flow.

FIG. 5 illustrates vectoring effectiveness, defined as degrees of vectoring per percent of injected flow. As shown by trace 62, nozzle vectoring systems according to the present disclosure can be configured as described herein to achieve higher vectoring effectiveness with relatively low injected flows (e.g., vectoring effectiveness of 8.5 can be produced with about 0.2% injected flow). Vectoring effectiveness for embodiments described herein is significantly greater than the range provided in past fluidic vectoring systems, shown in shaded zone 64, up to injected flow of approximately 2.6% where vectoring effectiveness may be about 2.9, at the upper limit of conventional systems' performance range.

In some embodiments, a synthetic jet may be used in place of or in addition to fluidic jets. The synthetic jet may be selected or configured to generate a disturbance comparable to a disturbance created by a fluidic jet, e.g., by comparing the root mean square (RMS) of the mass flow ratio of the synthetic jet to the steady blowing value of a fluidic jet. For example, to obtain an equivalent of 2% mass flow steady blowing, a RMS of 2% mass flow may be used in the case of a synthetic jet. The frequency of the pulse can be determined based on the length of the divergent section (L) and the velocity of the flow in the divergent section (U). A time scale (T) can be defined as T=L/U. In some embodiments, a desired separation effect may be achieved using a synthetic jet operable to generate pulses at a frequency of at least 20*(1/T) Hz.

FIG. 6 illustrates normalized pressure ratio along the divergence length of a nozzle according to the present disclosure as compared to that of a conventional shock vector nozzle. The normalized pressure ratio $P/P_{ambient}$ (static pressure normalized by the freestream ambient pressure) of a nozzle vectoring system of the present disclosure is shown in solid line in the graph in FIG. 6 and pressure ratios of a conventional nozzle are shown in dash line. In this embodiment, the nozzle vectoring system has a divergent outlet portion 14 having a 16 degree divergence angle as compared to a shock vector nozzle with a 12.65 degree divergence angle. For the embodiment shown, trace 46 shows the pressure ratio for a nozzle vectoring system with a disturbance generator having an injection slot located at 70% of the divergence length (e.g., the nozzle throat 42 corresponding to 0% of the divergence length and the trailing edge 40 corresponding to 100% of the divergence length). As illustrated by trace 46, a separation pocket is formed is formed extending nearly to the nozzle throat as demonstrated by the substantially uniform pressure upstream of the injection slot extending almost to the nozzle throat (within 5% of the divergence length). A comparison trace 48 shows the pressure ratios for a shock vectoring system having a flow injection slot at approximately 80% of divergence length. In the conventional system, shock formation occurs as indicated by shock position identifiable based on the knee 50 in trace 48. As can be observed in the comparative data in FIG. 6, nozzle vectoring systems according to the present disclosure may be capable of achieving a more uniform pressure upstream of the injection slot and maintaining a higher pressure downstream of the injection slot as compared to conventional shock vectoring nozzles. The angles of the convergent and divergent walls of nozzles according to the present disclosure create flow separation up to the throat thereby preventing casting a shock, which can lead to thrust loss.

As described, the examples herein may be utilized with virtually any nozzle system including 2D nozzles, as well as square, rectangular or trapezoidal three dimensional 3D nozzles, and cylindrical 3D (e.g., as shown in FIG. 7). FIG. 7 shows an axisymmetric nozzle 64 including a convergent inlet portion 61 and a divergent outlet portion 62. The nozzle 64 may include many or all components similar to the components of the 2D embodiments described above and for brevity and clarity their description is not repeated. The convergent inlet portion 61 and divergent outlet portion 62 of nozzle 64 may have similar geometric relationships to the 2D embodiments described above. For example, the nozzle 64 may have a total angle 15 of less than 150° created by the convergence angle 20 of the inlet portion 61, which may be greater than 18°, and divergence angle 22 of the outlet portion 62, which may be greater than 12°. The disturbance generators may be implemented as multiple injection inlets or slots 66 with associated feed conduits 68 that may be provided around a circumference of the diverging outlet portion 62 of the nozzle 64. In the depicted example, eight inlets or slots 66 arranged at 45° radial spacing are shown. Other arrangements of the inlets or slots may be utilized, e.g., four inlets at 90° radial spacing or a greater or smaller number of inlets may be employed in certain applications. Multiple sets of injection inlets or slots may be spaced along the length of the diverging outlet portion to accommodate various design operating conditions of the jet as may be desired.

Figure 8A:
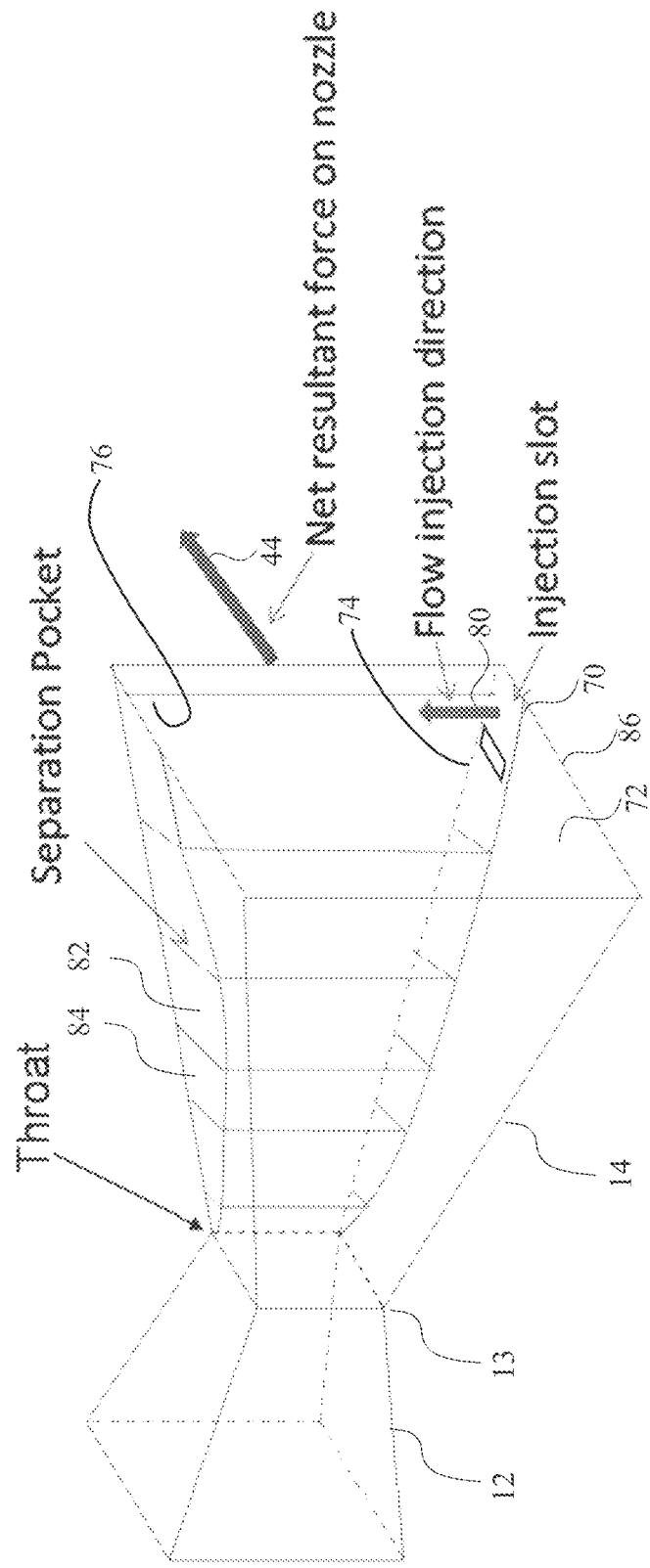
FIG. 8A is a pictorial representation of an adjacent injection embodiment.
Figure 8B:
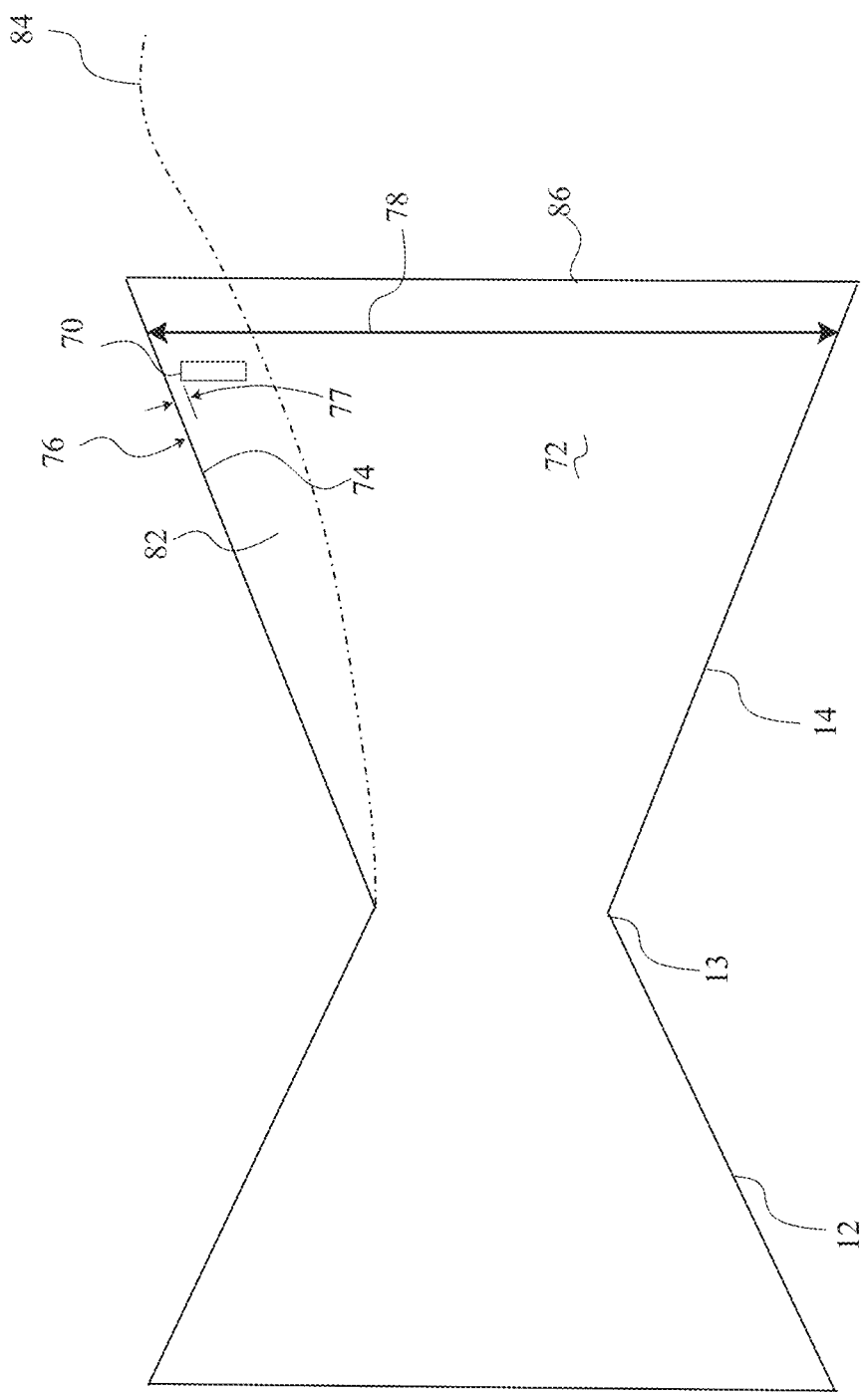
FIG. 8B is a top view of the embodiment of FIG. 8A.

In some examples, the disturbance generator may be located on a wall adjacent to the divergent wall on which separation is desired. As shown in FIGS. 8A and 8B, a disturbance generator 70, which may be a fluidic jet injection slot as previously described, is provided in a wall 72 of the divergent outlet portion 14. The disturbance generator may be proximate an intersection of the two walls. For example, as shown in FIGS. 8A-8B, the disturbance generator 70 is immediately adjacent the intersection 74 of wall 72 and divergent wall 76. In some embodiments, spacing 77 of disturbance generator 70 from the intersection 74 is no more than a factor of 2 times the width of the slot. In exemplary embodiments the distance of the injection slot from the divergent wall may be 10%-20% of a width 78 of the adjacent wall between the divergent walls. The effect of the disturbance, (e.g., flow injection from a fluidic jet represented by arrow 80 from the disturbance generator 70 or a synthetic jet) is substantially parallel to the divergent wall 76 and creates a flow separation zone or separation pocket 82 between the divergent wall and the jet plume boundary 84. The dimensions of the slots and separation pocket in FIGS. 8A and 8B are exaggerated for clarity and are not to scale as previously described with respect to FIGS. 1A and 1B. Location of the disturbance generator 70 may be from a midpoint of the divergence length to the trailing edge 86 of the nozzle with exemplary embodiments at 25 to 75% of the divergence length. While the nozzle of FIGS. 8A and 8B is depicted as a "square" nozzle with symmetrical divergence in both sets of opposing walls, the nozzle may be a 2D nozzle with non-diverging walls orthogonal to the diverging walls as shown in FIG. 8C. While described as a single injection slot on one adjacent wall, symmetrical slots on opposing adjacent walls to a divergent wall of the nozzle may also be employed.

Figure 9A:
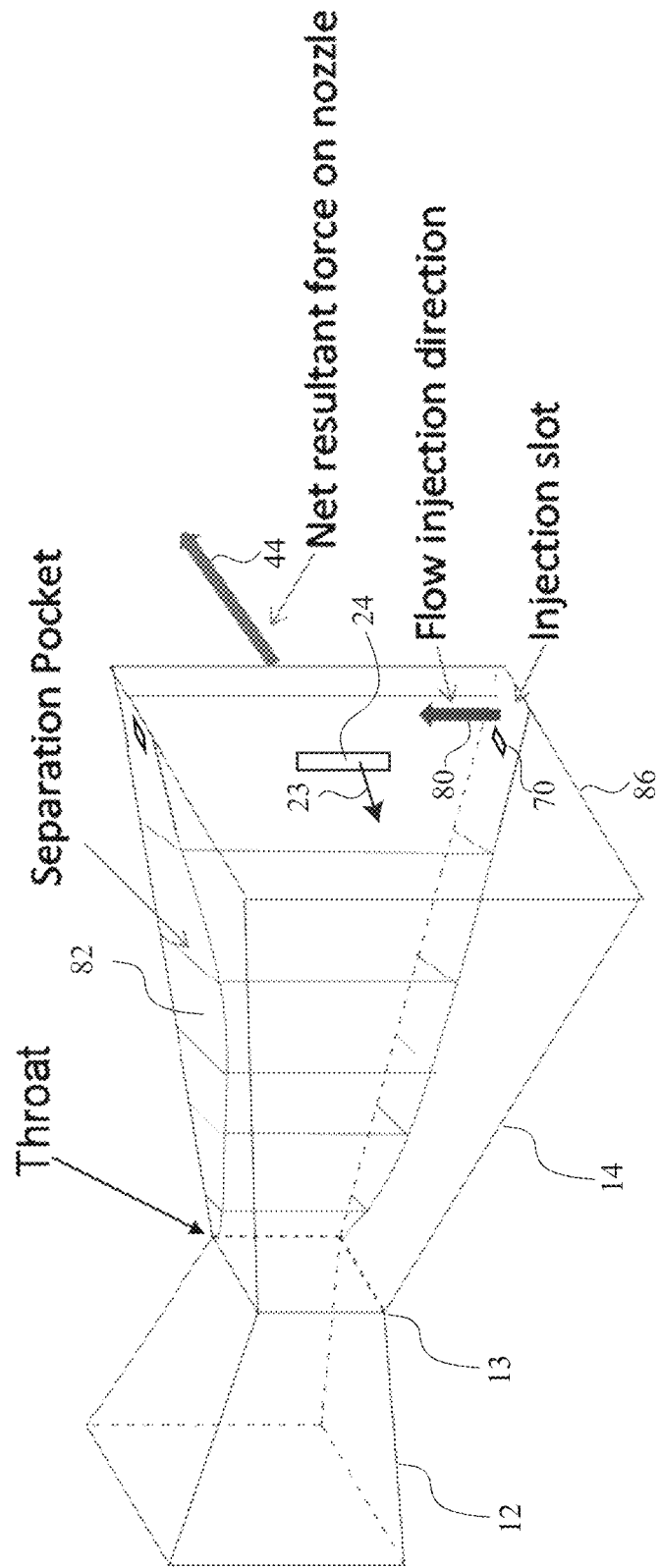
FIG. 9A is a pictorial representation of a combined adjacent and common wall injection for flow separation.

Combination of disturbance generators on both the divergent wall and adjacent wall may also be employed as shown in FIGS. 9A and 9B. A disturbance generator 70 such as an injection slot for a fluidic jet or a synthetic jet is provided in a wall 72 of the divergent nozzle portion 14. As described with respect to the embodiment of FIGS. 8A and 8B, disturbance generator 70 is immediately adjacent the intersection 74 of wall 72 and divergent wall 76. In exemplary embodiments the distance of the injection slot from the divergent wall may be 10%-20% of a width 78 of the adjacent wall between the divergent walls from which flow separation is desired. Flow injection as a fluidic jet, represented by arrow 80 from the disturbance generator 70, is substantially parallel to the divergent wall 76. Additionally, a disturbance generator 24 such as an injection slot for fluidic jet or a synthetic jet is provided in the divergent wall 76 of the nozzle. For a fluidic jet implementation, the jet 23 from disturbance generator 24 is substantially perpendicular to the divergent wall 76. As previously described with respect to FIGS. 1A and 1B, the injection location will typically be between the midpoint and trailing edge 86 of the divergent outlet portion 14 with exemplary embodiments having a nominal range of 25% to 75% of divergence length. Initiation of the separation pocket 82 may be created by injection in either the disturbance generator 24 on the divergent wall or the disturbance generator 70 on the adjacent wall 72 or both. Modulation of the separation pocket and therefore the thrust vectoring effect may be accomplished by adjustment of flow through either disturbance generator 24 on the divergent wall or the disturbance generator 70 on the orthogonal wall 72 or both.

Figure 10A:
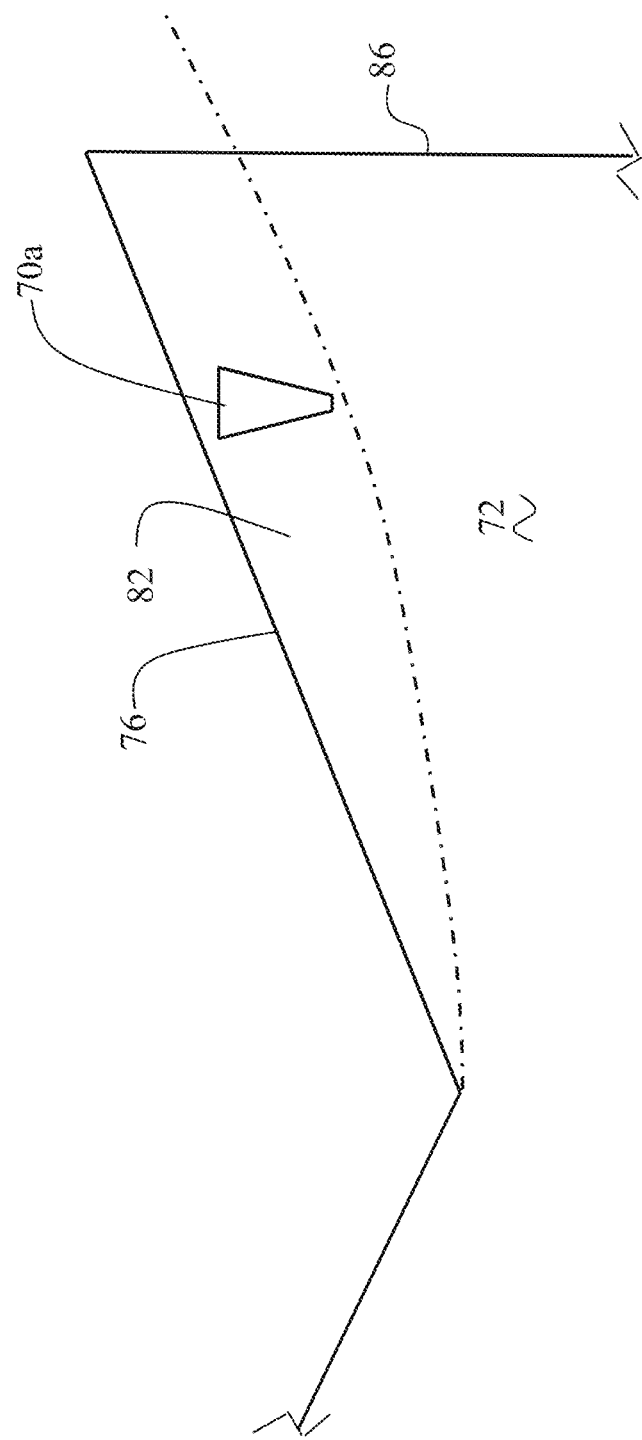
FIG. 10A is a plan view of an injection slot having a tapered planform.
Figure 10C:
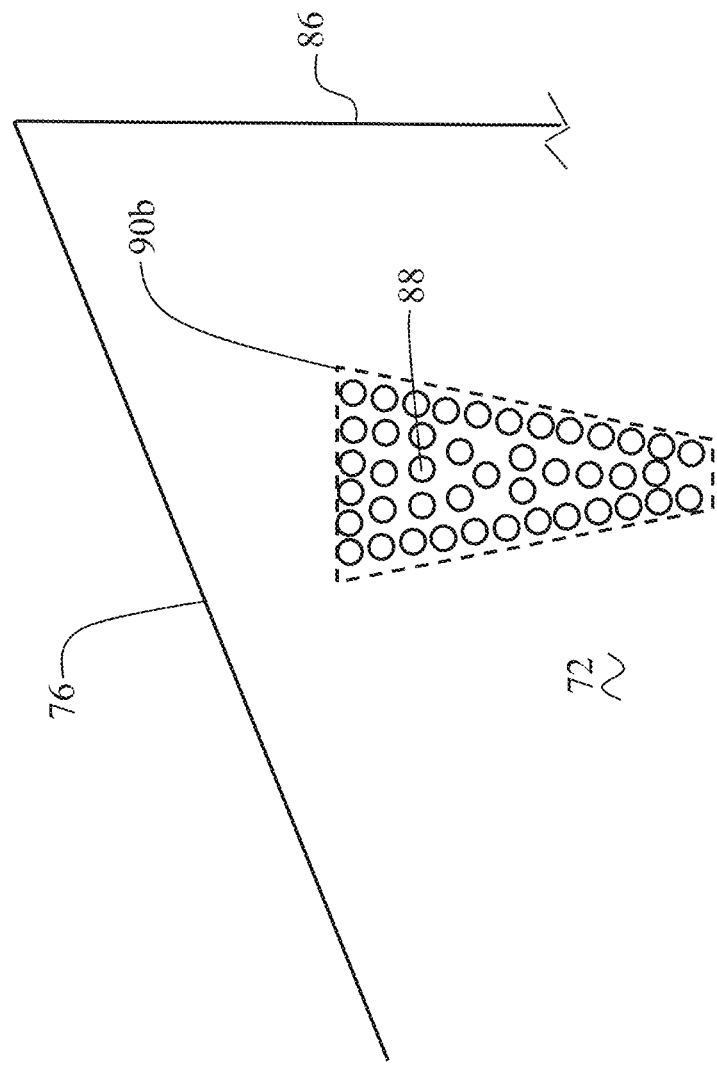
FIG. 10C is a plan view of a perforated injection having a trapezoidal planform; and, FIG. 11 is a flow chart depicting operation of the exemplary nozzle for thrust vectoring.

While the injection slots for the disturbance generators employing fluidic jets are shown in the previously described embodiments as rectangular slots, the jets may be generated with tapering slots 70a as shown in FIG. 10A having a larger streamwise width adjacent the intersection of the divergent and adjacent walls. The tapered slot may be trapezoidal or triangular. Additionally, the slots may be created by spaced perforations 88 in the surface of the wall 72 providing in combination a generalized rectangular or tapered area injector 90a or 90b as shown in FIGS. 10B and 10C respectively.

Methods for thrust vectoring have been described. According to some examples, a method for thrust vectoring may include accelerating a flow to supersonic speed by passing a flow through a convergent-divergent nozzle, which includes a sharp throat, a total angle between convergent and divergent portions of the nozzle of less than 150 degrees, and a divergence angle of the divergent portion of at least 12°, the convergent-divergent nozzle further including a disturbance generator located on the divergent portion, and generating a disturbance by the disturbance generator to induce shockless flow separation from a wall of the divergent portion According to the examples herein, the divergent portion has substantially flat walls extending from the sharp throat and the disturbance generator is located at a predetermined location, which in combination with the geometry of the nozzle is operable to generate a disturbance to create a flow separation zone which extends substantially from the throat to a trailing edge of the nozzle. In some instances, the disturbance generator is fluidic jet which uses a secondary flow (e.g., flow diverted from the engine or exhaust flow to cause the disturbance. In some examples, the disturbance generator may include one or more injection slots. Secondary flow of about 0.2% of total engine flow (e.g., exhaust flow) may be injected through the injection slot to generate a vectoring effectiveness of 8. In further examples, a zero-net max flux jet may be used to cause the shockless flow separation.

Figure 11:
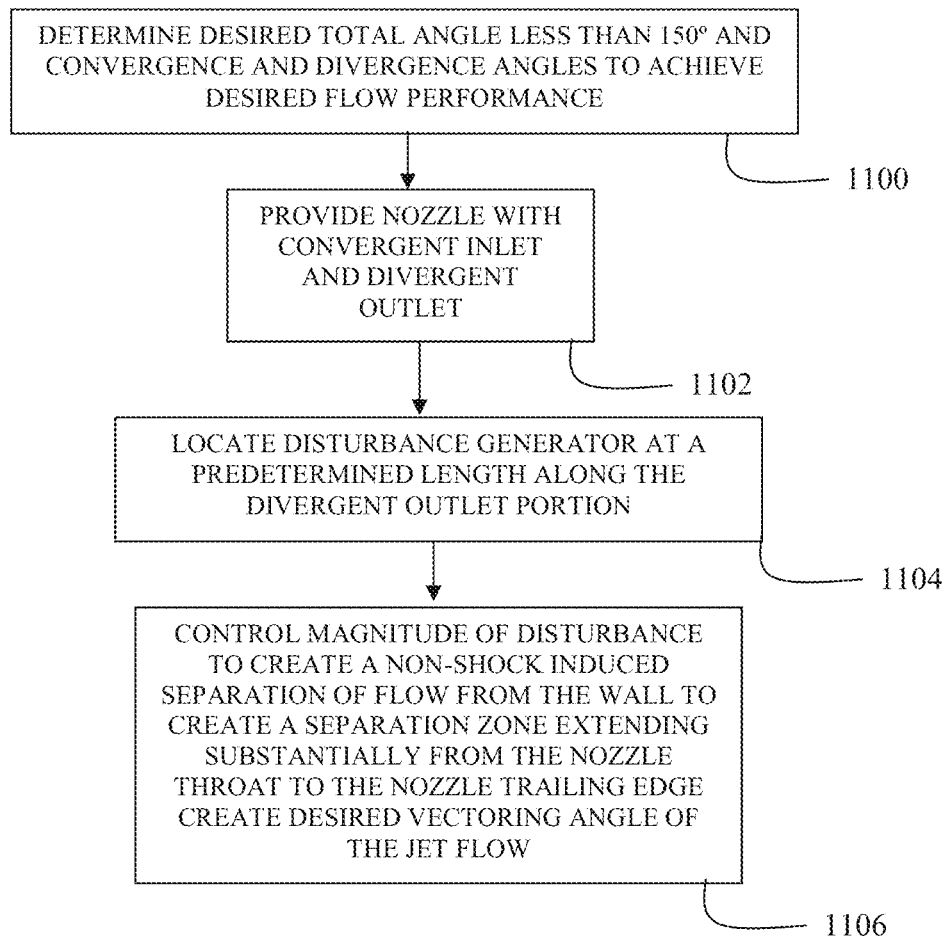

Operation of some embodiments disclosed herein is described with reference to FIG. 11. A nozzle with convergent inlet and divergent outlet is provided in step 1102 after determination of a desired total angle and convergence and divergence angles to achieve desired flow performance in step 1100. A disturbance generator such as a fluidic jet having an injection slot, a vibrating membrane, or a sonic impulse generator, is located at a predetermined location along the length of the divergent outlet portion of the nozzle, as shown in step 1104. In some examples, the disturbance generator may be located on a wall adjacent the separation wall (e.g., an orthogonal wall adjacent the divergent wall, as shown in step 1105). The magnitude of the disturbance created by the generator is controlled to induce shockless separation of the flow from the wall of the divergent outlet portion to create a separation zone extending substantially from the nozzle throat to the nozzle trailing edge. As described, a separation zone having a magnitude suitable to create desired vectoring angle of the jet flow, as in step 1106, may be achieved without shock formation using the nozzle systems described herein. A feedback control loop may be implemented to monitor the current thrust vector angle and the desired vector angle. The feedback controller would increase/decrease injection to increase/decrease the vector angle, respectively.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:
1. A thrust vectoring system comprising:
a convergent-divergent nozzle including:
a convergent inlet portion,
a divergent outlet portion having a divergent wall with a flatness defined, in a streamwise direction, by a curve having a second derivative with a magnitude of less than 0.005 inch$^{-1}$, and
a throat therebetween having a sharpness defined, in the streamwise direction, by a curve having a second derivative with a magnitude greater than 4 inch$^{-1}$; and
a disturbance generator located in the divergent outlet portion at a location selected to induce shockless flow separation, wherein the divergent wall is a first wall and wherein the disturbance generator is located on a second wall adjacent to and substantially orthogonal to the first wall and configured to cause a separation pocket along the first wall, the orientation of the separation pocket extending from the throat to a downstream end of the nozzle and from a first lateral side of the first wall to a second lateral side of the first wall.

2. The thrust vectoring system of claim 1, wherein the convergent inlet portion and the divergent outlet portion have a total angle no greater than 150 degrees and a divergence angle is at least 12 degrees relative to a streamwise nozzle axis and wherein the convergent inlet portion includes a convergent wall having a convergence angle greater than the divergence angle.

3. The thrust vectoring system of claim 2, wherein the convergence angle is at least 18 degrees relative to the streamwise nozzle axis.

4. The thrust vectoring system of claim 1, wherein the disturbance generator comprises an injection slot.

5. The thrust vectoring system of claim 1, wherein the disturbance generator is a zero-net mass flux jet.

6. The thrust vectoring system of claim 1, wherein the disturbance generator is located between 25% and 75% of a divergence length.

7. The thrust vectoring system of claim 1, wherein the disturbance generator is a first disturbance generator, and wherein a second disturbance generator is located on the divergent wall and configured to cause a separation pocket along the divergent wall.

8. The thrust vectoring system of claim 7, the divergent portion further comprising the second wall and a third wall adjacent to the first wall, the third wall including a third disturbance generator, the first disturbance generator positioned proximate an intersection of the first and second walls and the third disturbance generator position proximate an intersection of the first and third walls, said first and third disturbance generators cooperating with the second disturbance generator to induce flow separation on the first wall.

9. The thrust vectoring system of claim 8, wherein the first and third disturbance generators are located downstream from the second disturbance generator.

10. The thrust vectoring system of claim 1, wherein the disturbance generator includes an injection slot proximate an intersection of the first wall and the second wall.

11. The thrust vectoring system of claim 1, wherein the disturbance generator comprises a first injection slot on the first wall of the nozzle and a second injection slot on the second wall of the nozzle.

12. The thrust vectoring system of claim 1, wherein the disturbance generator is configured to provide a vectoring effectiveness of at least 8 for about 0.2% of injected flow.

13. The thrust vectoring system of claim 1, wherein the convergent-divergent nozzle is a 3D nozzle and the disturbance generator comprises a plurality of injection slots arranged circumferentially around the divergent outlet portion of the nozzle.

14. The thrust vectoring system of claim 1, wherein the throat has a sharpness defined, in a streamwise direction, by a curve having a second derivative with a magnitude of about 4 inch$^{-1}$ to about 8 inch$^{-1}$.

15. The thrust vectoring system of claim 1, wherein the divergent wall has a flatness defined, in a streamwise direction, by a curve having a second derivative with a magnitude of about 0.005 inch$^{-1}$ to about 0.002 inch$^{-1}$.

16. A method for thrust vectoring comprising:
   accelerating a flow to supersonic speed by passing a flow through a convergent-divergent nozzle, the convergent-divergent nozzle including a throat having a sharpness defined, in the streamwise direction, by a curve having a second derivative with a magnitude greater than 4 inch$^{-1}$, a total angle between convergent and divergent portions of the nozzle of less than 150°, and a divergence angle of the divergent portion of at least 12°, the convergent-divergent nozzle further including a disturbance generator located on the divergent portion; and
   generating a disturbance by the disturbance generator to induce shockless flow separation from a first wall of the divergent portion, wherein the disturbance generator is located on a second wall adjacent to and substantially orthogonal to the first wall and configured to cause a separation pocket along the first wall, the orientation of the separation pocket extending from the throat to a downstream end of the nozzle and from a first lateral side of the first wall to a second lateral side of the first wall.

17. The method of claim 16, wherein the divergent portion has a flatness defined, in a streamwise direction, by a curve having a second derivative with a magnitude of less than 0.005 inch$^{-1}$ extending from the throat, and wherein said generating a disturbance includes generating a disturbance at a predetermined location selected to create a flow separation zone extending substantially from the throat to the downstream end of the nozzle.

18. The method of claim 16, further comprising using a zero-net max flux jet to cause the flow separation.

19. The method of claim 18, wherein the zero-net max flux jet is a synthetic jet and wherein said generating a disturbance by the disturbance generator comprises generating pulses with the synthetic jet at a pulse frequency of at least 20*(1/T) Hz.

20. A method for thrust vectoring comprising:
   accelerating a flow to supersonic speed by passing a flow through a convergent-divergent nozzle, the convergent-divergent nozzle including a sharp throat, a total angle between convergent and divergent portions of the nozzle of less than 150°, and a divergence angle of the divergent portion of at least 12°, the convergent-divergent nozzle further including a disturbance generator located on the divergent portion; and
   generating a disturbance by the disturbance generator to induce shockless flow separation from a wall of the divergent portion wherein the disturbance generator includes an injection slot; and,
   injecting up to about 0.2% of total exhaust flow through the injection slot to provide a vectoring effectiveness of greater than 8.0.

21. The method of claim 16, wherein the disturbance generator includes an injection slot, the method further comprising injecting a range of 0.2% to 2.6% of total exhaust flow to produce a range of vectoring effectiveness from 8.5 to 2.9.

* * * * *